(12) United States Patent
Sawaguchi et al.

(10) Patent No.: US 6,912,100 B2
(45) Date of Patent: Jun. 28, 2005

(54) DEVICE AND SIGNAL PROCESSING CIRCUIT FOR MAGNETIC RECORDING, MAGNETIC RECORDING APPARATUS

(75) Inventors: Hideki Sawaguchi, Kokubunji (JP); Yasutaka Nishida, Kodaira (JP); Hisashi Takano, Kodaira (JP); Toru Matsushita, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/823,560

(22) Filed: Apr. 14, 2004

(65) Prior Publication Data

US 2004/0190172 A1 Sep. 30, 2004

Related U.S. Application Data

(63) Continuation of application No. 09/875,875, filed on Jun. 8, 2001, now Pat. No. 6,741,412.

(30) Foreign Application Priority Data

Jun. 8, 2000 (JP) ........................................ 2000-177135

(51) Int. Cl.$^7$ ................................................. G11B 5/09
(52) U.S. Cl. ............................ 360/45; 360/53; 360/65
(58) Field of Search ............................... 360/45, 53, 65, 360/25, 46, 55, 234.4, 317, 244.1, 318, 319, 318.1; 708/319; 375/229, 230, 232; 714/794, 795

(56) References Cited

U.S. PATENT DOCUMENTS

| 5,581,568 A | 12/1996 | Togami |
| 2002/0060869 A1 | 5/2002 | Sawaguchi et al. |

FOREIGN PATENT DOCUMENTS

| JP | 11066755 A | 3/1999 |

OTHER PUBLICATIONS

Messerschmitt, "Design of a finite impulse response for the Viterbi algorithm adn decision–feedback equalizer," Processing of ICG, Jun. 1974.

Haykin, *Introduction to Adaptive Filters*, Dec. 1984.

*Primary Examiner*—Alan T. Faber
(74) *Attorney, Agent, or Firm*—Antonelli, Terry, Stout & Kraus, LLP

(57) ABSTRACT

A magnetic recording/reproducing apparatus includes a partial-response equalization circuit having frequency characteristic of cutting off low-frequency signal components inclusive of DC components; and a maximum-likelihood decoder, in which a reproduced signal outputted from the reproducing head is processed by the partial-response equalization circuit and then inputted into the maximum-likelihood decoder to be data-reproduced, thereby reducing a noise and distortion on the reproduced signal and reducing a data detection error rate.

26 Claims, 6 Drawing Sheets

SCHEMATIC DIAGRAM OF INVENTED
PARTIAL-RESPONSE EQUALIZATION
(TIME-DOMAIN WAVEFORM)

SCHEMATIC DIAGRAM OF INVENTED
PARTIAL-RESPONSE EQUALIZATION
(FREQUENCY-DOMAIN SPECTRUM)

FIG. 4

| K | n=5 (a1, a2, a3, a4, a5) | n=6 (a1, a2, a3, a4, a5, a6) | n=7 (a1, a2, a3, a4, a5, a6, a7) |
|---|---|---|---|
| 0.8 | (1.0, 0.44, -0.45, -0.63, -0.36) | (1.0, 0.54, -0.28, -0.51, -0.48, -0.27) | (1.0, 0.60, -0.19, -0.39, -0.43, -0.38, -0.21) |
| 0.9 | (1.0, 0.56, -0.46, -0.71, -0.39) | (1.0, 0.67, -0.25, -0.58, -0.55, -0.29) | (1.0, 0.74, -0.13, -0.45, -0.50, -0.44, -0.22) |
| 1 | (1.0, 0.67, -0.45, -0.79, -0.43) | (1.0, 0.81, -0.21, -0.66, -0.63, -0.31) | (1.0, 0.88, -0.06, -0.50, -0.58, -0.50, -0.24) |
| 1.1 | (1.0, 0.78, -0.44, -0.88, -0.46) | (1.0, 0.94, -0.15, -0.73, -0.73, -0.33) | (1.0, 1.02, 0.04, -0.55, -0.69, -0.57, -0.25) |
| 1.2 | (1.0, 0.88, -0.42, -0.96, -0.50) | (1.0, 1.06, -0.07, -0.81, -0.82, -0.36) | (1.0, 1.16, 0.15, -0.59, -0.80, -0.65, -0.27) |
| 1.3 | (1.0, 0.98, -0.40, -1.04, -0.54) | (1.0, 1.19, 0.01, -0.89, -0.92, -0.39) | (1.0, 1.30, 0.28, -0.62, -0.93, -0.74, -0.29) |
| 1.4 | (1.0, 1.06, -0.37, -1.12, -0.57) | (1.0, 1.30, 0.10, -0.96, -1.02, -0.42) | (1.0, 1.44, 0.42, -0.65, -1.06, -0.83, -0.32) |
| 1.5 | (1.0, 1.14, -0.35, -1.18, -0.61) | (1.0, 1.42, 0.19, -1.03, -1.13, -0.45) | (1.0, 1.57, 0.58, -0.68, -1.19, -0.94, -0.34) |
| 1.6 | (1.0, 1.21, -0.32, -1.25, -0.64) | (1.0, 1.52, 0.28, -1.09, -1.22, -0.49) | (1.0, 1.70, 0.74, -0.69, -1.33, -1.05, -0.37) |
| 1.7 | (1.0, 1.28, -0.31, -1.31, -0.66) | (1.0, 1.62, 0.37, -1.15, -1.32, -0.52) | (1.0, 1.83, 0.90, -0.70, -1.47, -1.16, -0.40) |
| 1.8 | (1.0, 1.34, -0.29, -1.36, -0.69) | (1.0, 1.71, 0.46, -1.20, -1.42, -0.55) | (1.0, 1.95, 1.06, -0.69, -1.62, -1.27, -0.43) |
| 1.9 | (1.0, 1.39, -0.27, -1.41, -0.71) | (1.0, 1.80, 0.55, -1.26, -1.52, -0.57) | (1.0, 2.06, 1.23, -0.69, -1.76, -1.39, -0.45) |
| 2 | (1.0, 1.44, -0.25, -1.45, -0.74) | (1.0, 1.88, 0.63, -1.31, -1.60, -0.60) | (1.0, 2.16, 1.40, -0.68, -1.90, -1.50, -0.48) |

DEVICE AND SIGNAL PROCESSING CIRCUIT FOR MAGNETIC RECORDING, MAGNETIC RECORDING APPARATUS

CROSS-REFERENCE TO RELATED APPLICATIONS

This is a continuation of application Ser. No. 09/875,875 filed 8 Jun. 2001 now U.S. Pat. No. 6,741,412, the contents of which is incorporated herein in its entirety.

BACKGROUND OF THE INVENTION

1. Field of the Invention

The present invention relates to a magnetic recording/reproducing apparatus using a perpendicular magnetic recording double-layer film medium with a soft underlayer and a high-sensitive reproducing (read) head using a magneto-resistive effect element (hereinafter referred to as MR read head or MR reproducing head), and a magnetic recording/reproducing signal processing circuit for the magnetic recording/reproducing apparatus.

2. Description of the Related Art

Perpendicular magnetic recording is a promising technology for achieving a high-density magnetic recording system. Combining a single pole write head and a double-layered film structure medium comprised of a soft-under layer and a recording magnetic layer provides a practical approach for the perpendicular magnetic recording system. In this recording system, a recording (write) magnetic field generated from a main pole of the head forms a magnetic path in which the magnetic field is induced to the underlayer disposed on the rear of the recording magnetic layer and returned from an auxiliary pole to the recording head. By switching the direction of recording magnetic field, the recording magnetic layer is magnetized in two directions towards the thickness of the medium in correspondence with the recording information code, thereby storing information. In such recording by means of the recording head and medium structure, an intensive and steep perpendicular recording (write) magnetic field can be applied to the recording magnetic layer, so that high-resolution information storage can be achieved. Moreover, when magnetized recording information is reproduced from the perpendicular magnetic recording medium recording the information, as described above, by the high-sensitive MR reproducing head using the MR device, a reproduced signal from the head has a rectangular-shaped signal waveform corresponding to the magnetized recording pattern which is sensed immediately by the head.

In the case of a conventional longitudinal magnetic recording system, with use of a combination system of a partial-response equalizing system and a maximum-likelihood decoding system, SN quality of the reproduced signal is improved and such signal processing system is widely used for a high reliable data reproduction. On the other hand, the signal processing system adapted for data detection of the reproduced signal by a perpendicular magnetic recording system as described above is heretofore unknown well, but several techniques such as the partial response class 1 used in an optical recording/reproducing apparatus, an extended partial response channel (JP-A-11-66755) thereof and a technique similar to integral signal detection, have been already proposed because the reproduced signal contains a large amount of DC signal component and has the rectangular shape approximated by a low-pass fittered waveform of a recording magnetized pattern and the recording current waveform.

Further, there has been proposed a prosessing method similar to a conventional signal processing system, the processing method using a signal processing system similar to the longitudinal recording system to proviously process the reproduced signal from the perpendicular recording medium with a differentiation given, as a purpose of processing the reproduced signal is simplicity, and generating a pulse-shape signal waveform similar to the reproduced signal from the longitudinal recording system in pseudo manner.

As described above, the reproduced signal in the perpendicular magnetic recording system has a signal containing a large amount of rectangular-shape DC signal component. However, a lot of disturbance factors such as various kinds of noise from the recording medium and signal distortion due to low-frequency signal component loss in a signal transmission channel such as a reproduced signal amplifier are localized in the vicinity of the DC component of the reproduced signal. To eliminate the influence of the disturbance factors, an equalization process is performed for obtaining a waveform having such a frequency characteristic that the DC signal component of the reproduced signal is cut off and the region near the low-frequency signal component is suppressed.

In the signal processing system such as the partial-response class 1, the extended partial response channel thereof or the integral signal detection, it is, however, impossible to remove the DC component. Moreover, in the signal processing system in which the reproduced signal is differentiated before the equalization, the influence of noise and distortion in the low-frequency region can be eliminated because the DC component is cut off, but there is still a problem that the data error rate increases because the high-frequency noise component is emphasized by the differentiating process.

SUMMARY OF THE INVENTION

An object of the present invention is to provide a partial-response and maximum likelihood signal processing system capable of achieving a high-reliable data detection upon a signal reproduced from a perpendicular magnetic recording head medium system using a double-layer film recording medium and a single pole recording head/MR reproducing head. In order to achieve the object, there is provided means capable of reducing a noise and distertion on the reproduced signal and reducing a data detection error rate at the maximum-likelihood decoding because a waveform equalization condition for better adaptation to the reproduced signal is applied to the reproduced signal waveform of the high-density perpendicular magnetic recording system and the noise characteristic thereof in a partial-response equalization system.

To eliminate the influence of noise and distortion localized in the low-frequency region, the present invention provides the partial-response equalization system and an equalization circuit, in which the DC component can be removed from the equalized signal while the effect of suppressing increase of noise in the high-frequency region is sustained.

The partial-response equalization circuit in the present invention is constituted by a so-called transversal type filter having delay circuit elements connected multistageously for delaying an input signal for one bit-interval, a plurality of multipliers for multiplying each input signal, which is delayed substantially for one bit-interval, by a predetermined tap coefficient {h1, h2, h3, . . . hL}, and an adder for adding up the input signals multiplied by the tap coefficients respectively. The present invention has a feature that the tap coefficients satisfy the relation h1+h2+h3 . . . hL=0. With the tap coefficients determined in the aforementioned manner, the DC component can be cut off from the equalized signal waveform.

Moreover, a noise inputted into the maximum-likelihood decoder is whitened more optimally, so that the error rate of detection data is reduced. In addition, with the signal processing performed by use of the equalization system according to the present invention, the reliability of data detection can be made higher and the reproduced signal with a lower signal-to-noise ratio can be allowed compared with the disclosed technique in the related art. Hence, a magnetic recording/reproducing apparatus for achieving higher-density information storage can be provided.

BRIEF DESCRIPTION OF THE DRAWINGS

FIG. 4 is a table showing the relation between parameter K and values of partial-response intersymbol interference;

DETAILED DESCRIPTION OF THE EMBODIMENTS

Embodiment 1

Figure 1:
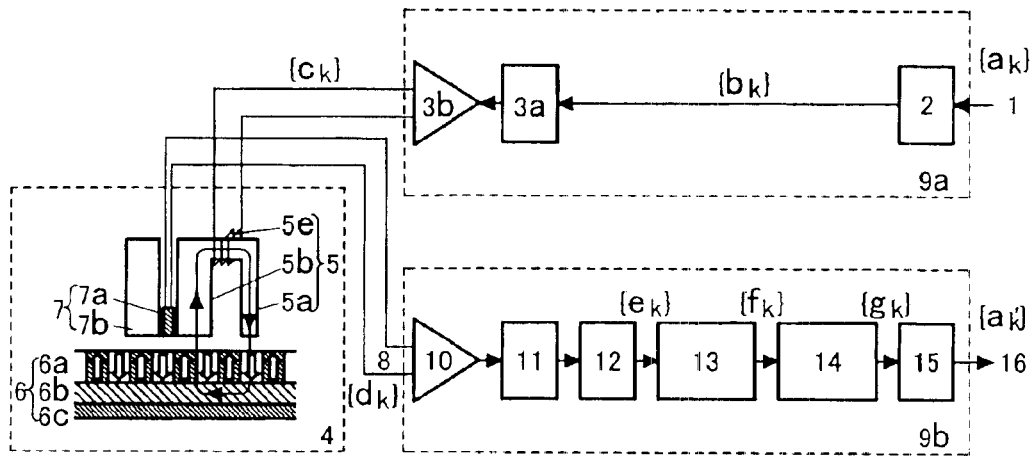
FIG. 1 is a block diagram showing a fundamental embodiment of the present invention.

FIG. 1 shows the fundamental configuration of an embodiment of a magnetic recording/reproducing apparatus according to the present invention. In this embodiment, information code data 1 $\{a_k\}$ (in which k is an integer indicating a bit-interval) supplied to a recording signal processing circuit 9a is subjected to a predetermined code conversion process in an encoder 2 for adding a run-length limitation and an error correction code, so that the data is converted into recording code data $\{b_k\}$. The recording code data $\{b_k\}$ is converted into an analog recording current signal $\{c_k\}$ via a data-to-recording current conversion circuit 3a and a recording signal amplifier 3b. Thereafter, the signal $\{c_k\}$ is supplied to a perpendicular magnetic recording head medium system 4, recording the information.

Figure 2:
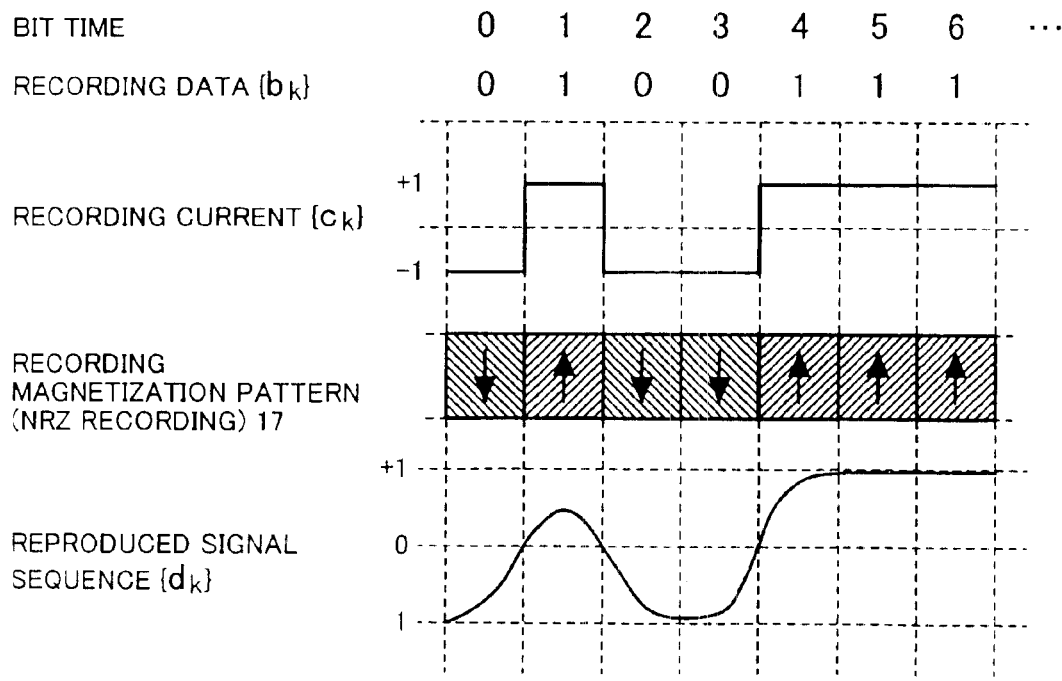
FIG. 2 is an explanatory diagram showing a recording/reproducing process in a perpendicular magnetic recording system.

A recording medium 6 used in the perpendicular magnetic recording head medium system 4 is a double-layer film perpendicular magnetic recording medium having both a recording magnetic layer 6a and a soft underlayer 6b on a substrate 6c. A single-pole head is used as a recording head 5. A main pole 5a in the recording head 5 is wound with a coil 5b so that a recording magnetic field is induced by a recording current which passes through the coil 5b. The recording magnetic field forms a magnetic path in which the magnetic write (recording) field returns to an auxiliary pole 5b via the underlayer 6b and returns to the main pole 5a. By this magnetic path, a steep perpendicular magnetic write (recording) field is applied to the recording magnetic layer 6a to magnetize the recording medium in the direction of the thickness of the medium. When magnetized recording information is reproduced from the thus recorded perpendicular magnetic recording medium by use of a reproducing head 7 having an MR effect element 7a disposed between the recording head 5 and a shield film 7b, a reproduced signal 8 from the reproducing head 7 is provided as a rectangular-shape signal corresponding to the distribution of recording magnetization (recording magnetized pattern) on the medium as shown in FIG. 2. That is, when an upward and downward recording magnetization is formed on the recording medium 6 (NRZ recording) while a recording current signal $\{c_k\}$ of two states, upward and downward, values corresponding to two code values $\{0, 1\}$ of the recording code data $\{b_k\}$ is made to flow into the recording head 5 in the condition that the recording medium 6 is moved, a dull-leading-edge rectangular-shape reproduced signal sequence $\{d_k\}$, in which the recording magnetization pattern 17 is sensed immediately and in which the voltage thereof changes stepwise in the position of transition in the direction of recording magnetization, is outputted as an analog reproduced signal from the reproducing head 7 running on the recording medium 6. The width of the leading edge of the waveform is determined on the basis of the structure and characteristic of the perpendicular magnetic recording head medium system 4, the recording/reproducing condition, and so on. The recording density is limited by the output voltage of the signal. Noise caused by various factors and signal distortion dependent on the frequency transmission characteristic of the head medium system and other electronic parts may overlie on the waveform.

In the reproduced signal processing circuit 9b, the reproduced signal 8 is amplified by a reproduced signal amplifier 10. Unnecessary high-frequency noise and signal components are removed from the amplified signal by a low-pass filter 11. Then, the signal is converted into a discrete-time reproduced signal sequence $\{e_k\}$ by an analog-to-digital (A/D) converter 12 which sample the signal from the low-pass filter 11 at a given sample timing. The discrete-time reproduced signal sequence $\{e_k\}$ is a sequence of signals digitized in the bit-interval timing of the recording code data $\{b_k\}$. In the present invention, the discrete-time reproduced signal sequence $\{e_k\}$ is subjected to partial-response equalization adapted to the reproduced signal 8 by an equalizer 13 provided in the post-stage in order to detect a high-reliable data sequence most efficiently. Further, in the present invention, the signal outputted from the equalizer 13 is converted into a detection data sequence $\{g_k\}$, which is regarded as being lowest in error rate, by a maximum-likelihood decoder 14. Particularly in the equalizer 13, intersymbol interference is allowed to take a known value in a range of a fixed bit length on the output signal waveform to thereby perform an equalization process so that increase of high-frequency noise caused by emphasis of high-frequency signal components in the equalization process is reduced as sufficiently as possible and so that the influence of signal distortion and noise is avoided in a low-frequency region inclusive of direct-current (DC) components of the reproduced signal 8. (This process will be described later in detail with reference to FIGS. 3A and 3B.) In the maximum-likelihood decoder 14, known values of intersymbol interference added by the equalizer 13 are used so that a higher-reliable data detection process against noise is achieved by use of the Viterbi algorithm. The detection data sequence $\{g_k\}$ is inversely converted through the decoder 15, so that reproduced code data 16 $\{a_k'\}$ corresponding to the original information code data 1 {$a_k$} is outputted as a reproduced signal.

Figure 3A:
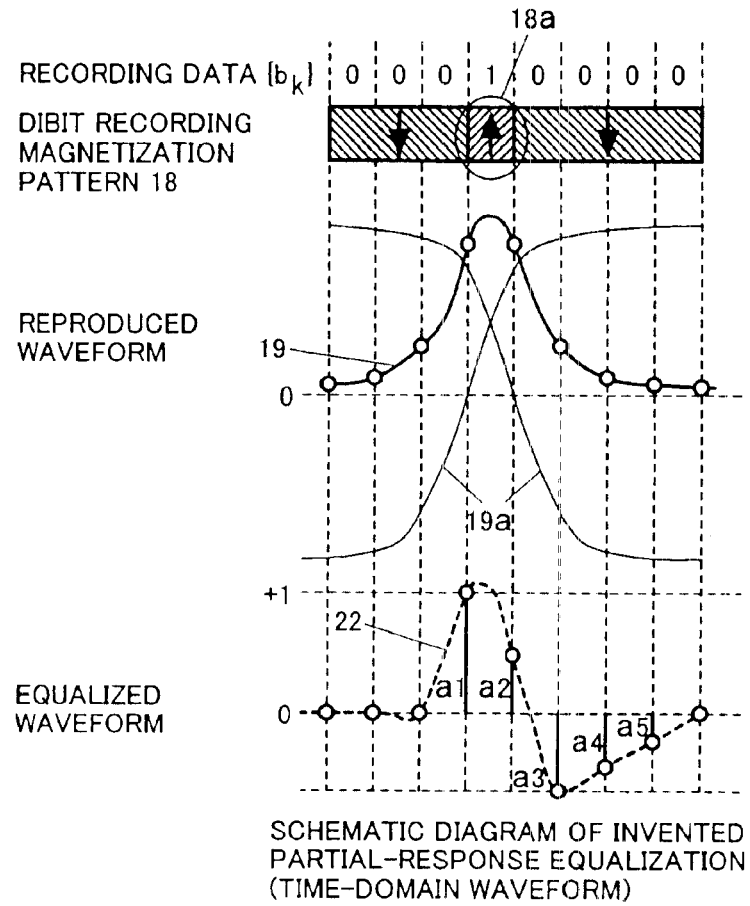
FIG. 3A is a characteristic diagram of invented partial-response equalization (time-domain waveform)
Figure 3B:
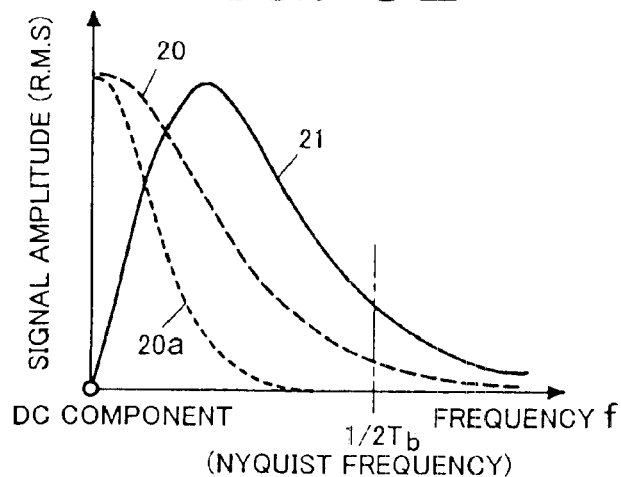
FIG. 3B is a characteristic diagram of invented partial-response equalization (frequency-domain spectrum)

FIGS. 3A and 3B show the details of the partial-response equalization process in the equalizer 13 described in the embodiment of FIG. 1. In FIG. 3A, the reproduced waveform 19 is a waveform which is outputted from the reproducing head 7 when a dibit recording magnetization pattern 18 (a pair of the closest recording transitions 18a recorded at the shortest bit-interval) on the recording medium 6 is reproduced. As described above, dull-leading-edge step response signals 19a overlie each other in synchronism with two magnetization recording transitions dependently on the frequency characteristic of the head medium system, so that an isolated pulse waveform is outputted. In a general perpendicular magnetic recording/reproducing system having the aforementioned head medium system, it is known that each step response signal 19a can be approximated by a tanh-type function. The dibit reproduced waveform 19 is approximated by the equation:

$$V\tanh\left(\frac{3.415t}{\pi \cdot K \cdot Tb}\right) - V\tanh\left(\frac{3.415(t-Tb)}{\pi \cdot K \cdot Tb}\right) \quad (1)$$

in which V is the amplitude of the signal, and K is a parameter that determines the width of the leading edge. This can be regarded as an output waveform of impulse response to the head medium system (response to an isolated bit "1" on the recording code data {$b_k$}). As shown in FIG. 3B, the power spectrum 20 in the frequency region of the dibit reproduced waveform 19 is formed so that bit detection energy is concentrated into a lower-frequency region with the DC component as its center.

On the other hand, the reproduced signal 8 from the reproducing head 7 is, however, subjected to data reproduction via electronic parts such as the reproduced signal amplifier 10 and through signal transmission path characteristic. Hence, the data reproduction cannot get rid of the influence of signal distortion caused by deterioration of the frequency characteristic. Particularly in the reproduced signal amplifier 10, the characteristic of cutting off low-frequency components inclusive of DC components cannot be allowed in order to achieve a wide range. As a result, signal distortion caused by low-frequency signal component loss becomes worse on the output signal. Compensation for the signal distortion owing to low-frequency signal component loss requires an excessive compensation circuit on the equalization process. Moreover, the compensation has an evil effect of bringing excessive emphasis of overlying noise components.

On the other hand, the spectrum 20a of medium noise sensed from the recording medium 6 by the reproducing head 7 is also localized in a low-frequency region with the DC component as its center. Hence, it is also difficult to separate the noise component from the low-frequency component of the reproduced signal and detect the noise component. To avoid these problems, in the present invention, the dibit reproduced waveform 19 is shaped into an equalized waveform 22 as represented by the equalized waveform power spectrum 21 in FIG. 3B. Gentle high-frequency component cut-off characteristic matched with the power spectrum 20 of the reproduced waveform 19 is allowed to suppress emphasis of high-frequency noise in the equalization process in the same manner as in the related-art partial-response equalization. At the same time, the DC component is made zero to suppress the low-frequency component. In this manner, the waveform shaping is performed so that low-frequency component cut-off characteristic is allowed.

Hence, signal distortion and medium noise localized in a low-frequency region on the reproduced signal can be suppressed. Data lower in noise and distortion can be detected from the equalized signal having the aforementioned frequency characteristic. Moreover, emphasis of noise in high-frequency region is suppressed in the equalization process of the equalizer 13, so that noise frequency characteristic is kept near to white. Hence, a more preferable noise environment is supplied to the maximum-likelihood decoder 14 provided in the post-stage, so that the data error rate in the detection data sequence {$g_k$} is reduced. The equalized waveform 22 having the aforementioned frequency characteristic can be obtained by selection of known values of intersymbol interference (s1, s2, s3, ... sn) at each sampled bit-interval in a range of a sufficient bit length n as shown in FIG. 3A.

In the related-art partial-response equalization process, setting of an equalized waveform having gentle high-frequency component cut-off characteristic achieves a appropriate selection of this value (a1, a2, a3, ... an) in accordance with the reproduced waveform 19. To suppress the DC signal component on the reproduced waveform 19 to zero in the present invention, the non-return-to-zero values of intersymbol interference (s1, s2, s3, ... sn) added by partial-response equalization are provided with a constraint given by the following equation (2).

$$s1+s2+s3+ \ldots sn=0 \quad (2)$$

The constraint given by the equation (2) is derived easily from the condition of H(0)=0 in the frequency of zero on the basis of the frequency expression H(f) (F is the frequency) of the equalized waveform 22:

$$H(f)=s1^*\exp(31\ 2\pi j fTb)+s2^*\exp(-2\pi j f 2Tb)+ \\ s3^*\exp(-2\pi j f 3Tb)+ \ldots sn^*\exp(-2\pi j f nTb) \quad (3)$$

in which f is the frequency of the equalized waveform. Methods for determining noise-whitening filter characteristic with respect to the reproduced waveform 19 under the constraint (2) to thereby minimize the noise power outputted from the equalizer 13 have been already given by a lot of classical filter theories. For example, with use of any one of various algorithms such as algorithm disclosed in the literature cited "Design of finite impulse response for the Viterbi algorithm and decision-feedback equalizer, D. G. Messerchmitt, Proceedings of I.C.C., June 1974", an adaptation algorithm of linear prediction filter, and the like, is used, an actual reproduced waveform can be processed easily. As a result, suitable values of intersymbol interference (s1, s2, s3, ... sn) given to a certain reproduced waveform 19 in the partial-response equalization or the like by the equalizer 13 can be determined uniquely and the equalization frequency-characteristic of the equalizer can also be determined uniquely.

FIG. 4 shows the amplitude ratios of optimal values of intersymbol interference (a1, a2, a3, ... an) to be set to reproduced waveforms 19 respectively when the parameter K in the equation (1) takes various values. If the bit length n for intersymbol interference is taken to be not smaller than 5, nearly optimal equalization frequency-characteristic can be obtained. Excessive increase of the bit length n, however, causes increase of the practical scale of the maximum-likelihood decoder 14 provided in the post-stage. Accordingly, it is necessary to reduce the bit length n as much as possible. When an integer ratio is selected so that the ratio of optimal values of intersymbol interference can be approximated by the integer ratio, the decoder can be simplified.

Figure 5:
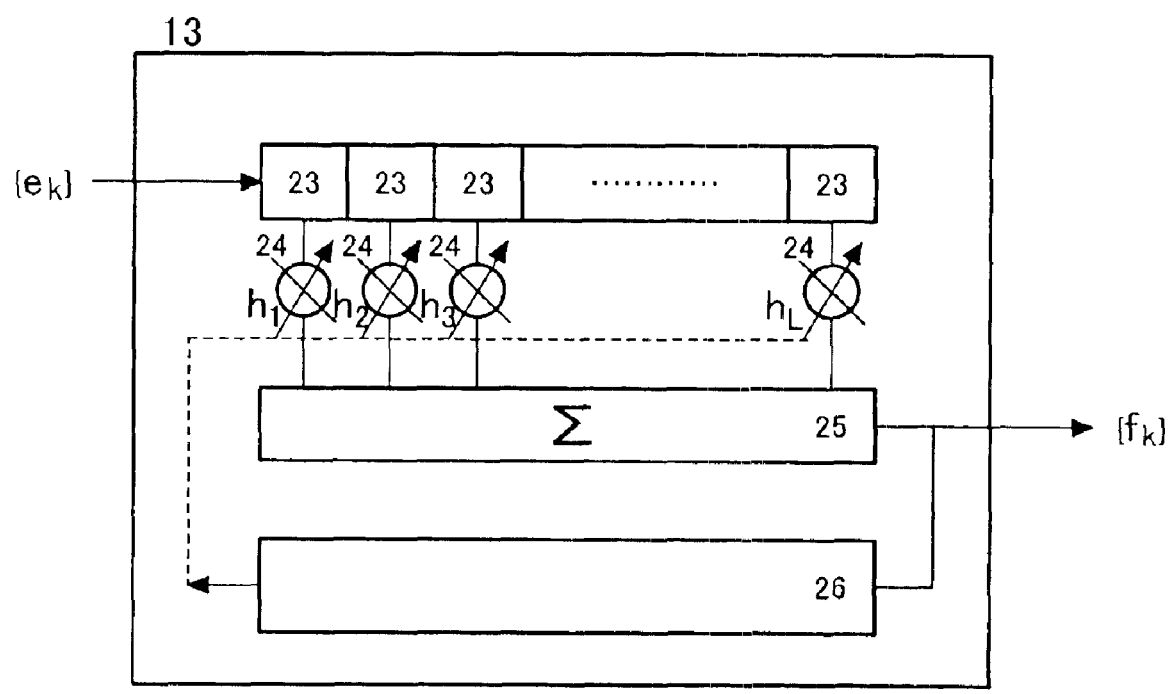
FIG. 5 is a block diagram showing the configuration of an equalizer.

Circuit parameters of the equalizer 13 corresponding to the optimal values of intersymbol interference (s1, s2, s3, . . . sn) determined in the aforementioned manner can be set very easily on the basis of the relation between the ratio of the optimal values of intersymbol interference and the input reproduced waveform 19 by a known filter design theory. In most cases, the equalizer 13 is a transversal filter composed of a shift register having series-connected storage delay devices 23 for storing one-bit signals respectively, and multipliers 24, for multiplying each storage content by a predetermined tap coefficient (h1, h2, h3, . . . hL; L is a tap length), an adder 25 and the like for performing a product-sum operation of the multiplied contents outputted from the multiplier 24, as shown in FIG. 5. A tap coefficient hK ($1 \leq K \leq L$) set to the reproduced waveform 19 having a DC frequency component under the constraint (2) has the relation:

$$h1+h2+h3+ \ldots hK \ldots +hL=0 \qquad (4)$$

A method for determining the filter tap coefficient hL to thereby achieve this constraint on the basis of the reproduced waveform 19 inputted under the constraint (4) of the tap coefficient and the known values of intersymbol interference (s1, s2, s3, . . . sn) outputted in accordance with the inputted reproduced waveform 19 is a commonly known technique which has been already described in detail in the literature cited "Introduction to Adaptive Filter (1984), Simon Haykin", and the like. As disclosed in the literature cited, while a signal outputted from the equalizer 13 is online-monitored to thereby evaluate error signal between the signal and a target signal determined on the basis of the values of intersymbol interference (s1, s2, s3, . . . sn), an optimal tap coefficient may be obtained by updating each tap coefficient hL consecutively while satisfying the constraint (4) by the adaptation circuit 26 and by use of adaptation algorithm such as a mean-square error (MSE) method or a least mean square (LSM) method. Especially, given the constraint (2) to (4), in this operation of tap adaptation, the adaptation prediction of a signal component near to the DC component becomes needless, so that a stabler and higher-accurate adaptation operation can be obtained for an actual recording/reproducing-channel signal having DC offset fluctuation, low-frequency distortion or medium noise in a region near to its DC component.

Figure 6:
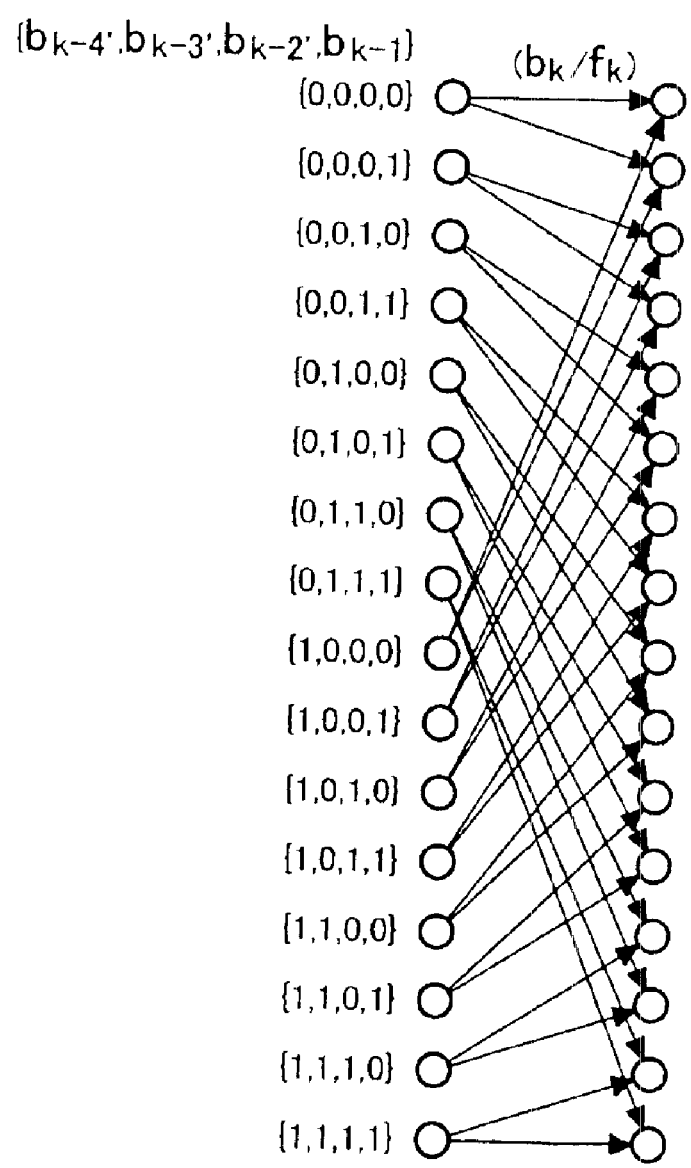
FIG. 6 is an explanatory view showing an example of state-transition trellis diagram of viterbi detection.

The signal outputted from the equalizer 13 as described above is detected by the maximum-likelihood decoder 14 and by use of the Viterbi algorithm, or the like. FIG. 6 shows an example (n32 5) of state-transition trellis diagram of the Viterbi detection. In FIG. 6, each arrow is provided with a combination of recording code data 3 $\{b_k\}$ predicted at bit-time k and a corresponding output signal value $\{f_k\}$ of the equalizer 13. When the aforementioned values of intersymbol interference (s1, s2, s3, . . . sn) are given, the output signal value $\{f_k\}$ is determined uniquely by a linear convolutional operation on the basis of the code value $\{b_k\}$ predicted at the current bit-interval k and the states of code values $\{b_{k-n+1}, \ldots, b_{k-1}\}$ retrospectively to (n-1) bits before. Accordingly, the number of states in the aforementioned trellis diagram is 2^(n-1). From the point of view of reducing the number of states, the bit length n of intersymbol interference in the equalizer 13 needs to be reduced to a required and sufficient value. Out of the all state transitions shown by the time course in the trellis diagram, a code sequence indicated by the most likelihood transition is selected as a detection data sequence.

Because the equalizer 13 in this embodiment has the characteristic of cutting off low-frequency components inclusive of DC components, the influence of DC component offset, low-frequency fluctuation and low-frequency distortion as often occurring on the actual reproduced signal can be largely eliminated. Especially, in a high-density recording/reproducing system, a phenomenon of thermal asperity (TA) in which magneto-resistive characteristic varies widely occurs because of the magneto-resistive element temperature rising due to contact between the MR effect element 7a and the recording medium 6 in accordance with the fluctuation of the flying height characteristic of the reproducing head 7 and the reduction of the distance between the reproducing head 7 and the recording medium 6. On this occasion, a large DC offset fluctuation occurs in the reproduced signal. The equalizer 13 according to the present invention can eliminate this influence on the post-stage. Moreover, because the DC frequency component is not detected in the maximum-likelihood detection for the partial-response equalization having the constraint (2), data detection can be performed without receiving any influence of the aforementioned phenomenon.

(Embodiment 2)

Figure 7:
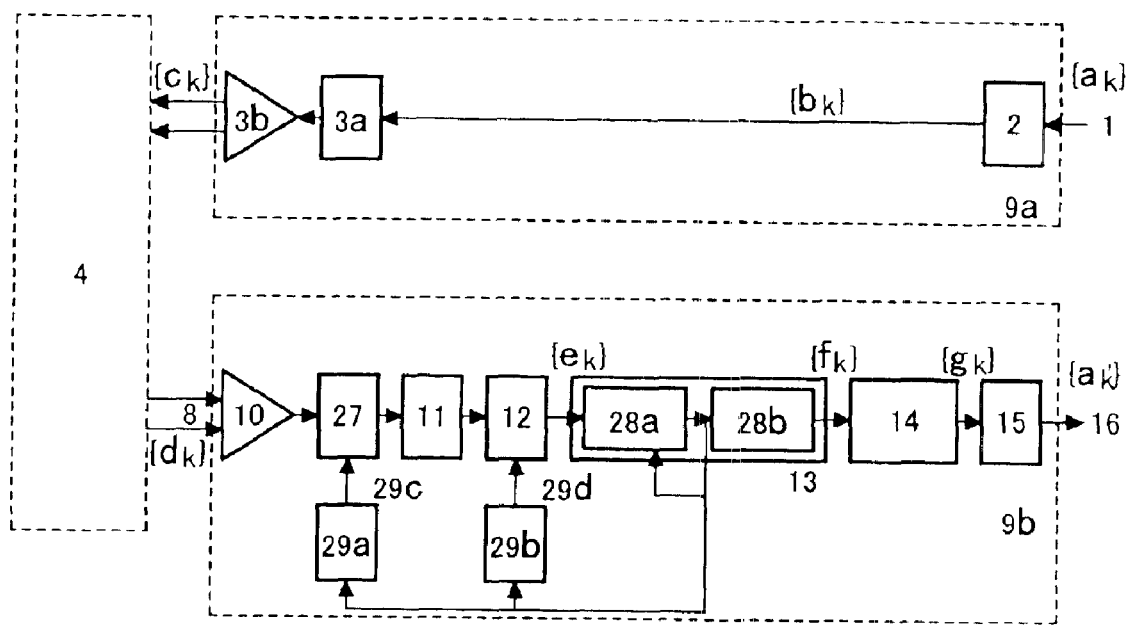
FIG. 7 is a block diagram showing a second embodiment of the present invention.

FIG. 7 shows a second embodiment of the present invention. In this-embodiment, the equalizer 13 is composed of a (1, 0, -1) equalizer 28a, and a (s1, s2, s3, . . . sn) partial-response interference value adding circuit 28b. In the (1, 0, -1) equalizer 28a, the dibit reproduced waveform 19 is shaped into a short-bit waveform having intersymbol interference (1, 0, -1) of a partial-response class 4. Then, in the (s1, s2, s3, . . . sn) partial-response interference value adding circuit 28b, desired values of partial-response interference are added. On this occasion, waveform response of the values of interference (s1, s2, s3-s1, . . . , sk-sk-2, . . . , sn-sn-2, -sn-1, -sn) corresponding to the input of the dibit reproduced waveform 19 is obtained on the whole of the equalizer 13. While the output of the (1, 0, -1) equalizer 28a is monitored, a gain control signal 29c for the reproduced signal 8 may be generated adaptively by use of an automatic gain control circuit 29a so that the fluctuation of the amplitude of the reproduced signal can be suppressed by use of an automatic gain amplifier 27.

Similarly, while the output of the (1, 0, -1) equalizer 28a is monitored, a sample timing signal 29d for the analog reproduced signal 8 may be detected by use of a sample timing extraction circuit 29b so that the sampling timing for the analog-to-digital converter 12 can be supported. With the signal in the pre-stage of the equalization circuit 28b monitored as in the present invention, the same simple circuit configuration as that of the related-art partial-response class 4 can be used as the circuit configuration for automatic gain and sample timing extraction. Moreover, the fluctuation of the DC signal component can be eliminated by the (1, 0, -1) equalizer 28a. Accordingly, a good control operation can be carried out while the influence of the fluctuation of the DC signal component is avoided. Also in the configuration of the equalizer 28 shown in FIG. 5, an easier and more efficient equalization process can be carried out if the signal inputted to the adaptation circuit 26 is taken from the output of the (1, 0, -1) equalizer 28a so that only the (1, 0, -1) equalizer 28a is subjected to adaptation. In this case, the equalization circuit 28b can be constituted by a transversal filter (product-sum operation circuit) with a fixed tap.

When a magnetic recording/reproducing apparatus and a signal processing or semiconductor integrated circuit which is mounted on the magnetic recording/reproducing apparatus are used as described above, information data can be recorded/reproduced with optimal reliability on a perpendicular magnetic recording head and medium system using a double-layer film medium with a soft underlayer and a reproducing head constituted by a magneto-resistive effect head with a shield film. Moreover, because lowering of resolution of the reproduced signal and lowering of the signal-to-noise ratio thereof can be allowed, higher-density information recording/reproducing can be achieved.

According to the present invention, the reliability of data detection in the maximum-likelihood detection upon a signal reproduced by a perpendicular magnetic recording system using a double-layer film medium and a high-sensitive MR reproducing head can be improved greatly and the quality of a lower signal-to-noise ratio can be allowed compared with the case using any disclosed technique in the related art. Hence, a magnetic recording/reproducing apparatus for achieving higher-density information recording and a signal processing circuit using the magnetic recording/reproducing apparatus can be provided.

According to the present invention, the influence of noise caused from the recording medium can be also reduced more effectively. Moreover, the present invention is made on the presumption that the reproduced waveform suffers low-frequency distortion caused by the frequency characteristic of the pre-stage signal transmission channel such as a reproduced signal amplifier. Because an equalization process is carried out to suppress such low-frequency distortion, increase of any special compensation circuit, or the like, is not required. Accordingly, there can be provided a recorded/reproduced signal processing circuit in which deterioration of the characteristic of the pre-stage signal transmission channel is allowed while the influence of low-frequency distortion is reduced.

Because the influence-of the aforementioned low-frequency disturbance can be eliminated by removing detection of the DC signal component from the reproduced signal, adaptation in the equalization process can be made accurate and speedy. In addition, there can be eliminated the influence on the maximum-likelihood data detection, of the DC offset, fluctuation, etc. of the reproduced waveform caused by the contact (thermal asperity) between the recording medium and the MR reproducing element and the fluctuation of the flying height characteristic of the reproducing head.

What is claimed is:

1. A signal processing apparatus for a perpendicular magnetic recording/reproducing apparatus, comprising:
    a partial-response equalization circuit including a digital filtering circuit having DC-null frequency characteristics cutting off low frequency signal components inclusive of DC components; and
    a maximum likelihood decoder,
    wherein a reproduced signal is reproduced by said partial-response equalization circuit and then inputted into said maximum-likelihood decoder to be reproduced Into a recording data sequence.

2. The signal processing apparatus according to claim 1, comprising a magneto-resistive sensor to reproduce and output a signal of a perpendicular magnetic recording medium having a soft under layer.

3. The signal processing apparatus according to claim 1, wherein a length n of an intersymbol interference is settable at longer than a five-bit interval for said partial-response equalization circuit end/or said maximum likelihood decoder.

4. The signal processing apparatus according to claim 1, comprising a register circuit to set up an amplitude ratio of an intersymbol interference and/or a length n of the intersymbol-interference out.

5. The signal processing apparatus according to claim 1, wherein reproduced signal waveforms corresponding to a pair of a closest two recording transitions recorded on a recording medium at a shortest bit-length interval are outputted as signal waveforms having intersymbol interference of an amplitude ratio of (a1, a2, a3, ... ak, ..., an) (in which k is an integer indicating a bit-interval, and a1 ... an are non-zero real numbers satisfying a relation: a1+a2+a3 ... ak+ ... +an=0) at each bit-interval time through said partial-response equalization circuit, and wherein said reproduced signal waveforms are inputted into said maximum-likelihood decoder for data reproduction.

6. The signal processing apparatus according to claim 5, wherein a1 ... an are non-zero real numbers satisfying the relation: n≧3 at each bit-interval through said partial-response equalization circuit.

7. The signal processing apparatus according to claim 6, wherein a1, a2 and a3 take an integer ratio of a1=4, a2=3 and a3=2.

8. The signal processing according to claim 7, comprising a signal processing circuit wherein said signal processing circuit is mounted on a semiconductor integrated circuit.

9. The signal processing apparatus according to claim 8, wherein said semiconductor integrated circuit is mounted on said perpendicular magnetic recording/reproducing apparatus.

10. The signal processing apparatus according to claim 6, wherein said partial-response equalization circuit is constituted by a transversal filter in which filter tap coefficients are changed or adjusted so that a sum of said tap coefficients is zero.

11. The signal processing apparatus according to claim 10, comprising a signal processing circuit wherein said signal processing circuit is mounted on a semiconductor integrated circuit.

12. The signal processing apparatus according to claim 11, wherein said semiconductor integrated circuit is mounted on said perpendicular magnetic recording/reproducing apparatus.

13. The signal processing apparatus according to claim 1, wherein reproduced signal waveforms corresponding to a pair of a closest two recording transitions recorded on a recording medium at a shortest bit-length interval are outputted as signal waveforms having intersymbol interference of an amplitude ratio of (a1, a2, a3–a1, ... , ak–ak–2, ... , an–an–2, –an–1, –an) (in which k is an integer indicating a bit-interval and a1 ... an are non-zero real numbers) at each bit-interval through said partial-response equalization circuit, and wherein said reproduced signal waveforms are inputted into said maximum-likelihood decoder for data reproduction.

14. The signal processing apparatus according to claim 1, wherein said partial response equalization circuit has a DC-null frequency characteristic of not passing tow-frequency signal components inclusive of DC components.

15. A signal processing apparatus for a perpendicular magnetic recording/reproducing apparatus, comprising:
    a partial-response equalization circuit having frequency characteristics cutting off low-frequency signal components inclusive of DC components; and
    a maximum likelihood decoder,
    wherein a reproduced signal is reproduced by said partial-response equalization circuit and then inputted into said maximum-likelihood decoder to be reproduced into a recording data sequence.

16. The signal processing apparatus according to claim 15, comprising a magneto-resistive sensor to reproduce and output a signal of a perpendicular magnetic recording medium having a soft under layer.

17. The signal processing apparatus according to claim 15, wherein reproduced signal waveforms corresponding to a pair of a closest two recording transitions recorded on a recording medium at a shortest bit-length interval are outputted as signal waveforms having intersymbol interference of an amplitude ratio of (a1, a2, a3, . . . , ak, . . . , an) (in which k is an integer indicating a bit-interval, and a1 . . . an are non-zero real numbers satisfying the relation: a1+a2+a3 . . . +ak+ . . . +an=0) at each bit-interval time through said partial-response equalization circuit, and said reproduced signal waveforms are inputted into said maximum-likelihood decoder for data reproduction.

18. The signal processing apparatus according to claim 17, wherein a1 . . . an are non-zero real numbers satisfying a relation n≧3 at each bit-interval through said partial-response equalization circuit.

19. The signal processing apparatus according to claim 18, wherein a1, a2 and a3 take an integer ratio of a1=4, a2=3 and a3=2.

20. The signal processing apparatus according to claim 19, comprising a signal processing circuit wherein said signal processing circuit is mounted on a semiconductor integrated circuit.

21. The signal processing apparatus according to claim 20, wherein said semiconductor integrated circuit is mounted on said perpendicular magnetic recording/reproducing apparatus.

22. The signal processing apparatus according to claim 18, wherein said partial-response equalization circuit is constituted by a transversal filter in which filter tap coefficients are changed or adjusted so that a sum of said tap coefficients is zero.

23. The signal processing apparatus according to claim 22, comprising a signal processing circuit wherein said signal processing circuit is mounted on a semiconductor integrated circuit.

24. The signal processing apparatus according to claim 23, wherein said semiconductor integrated circuit is mounted on said perpendicular magnetic recording/reproducing apparatus.

25. The signal processing apparatus according to claim 15, wherein reproduced signal waveforms corresponding to a pair of a closest two recording transitions recorded on a recording medium at a shortest bit-length interval are outputted as signal waveforms having intersymbol interference of an amplitude ratio of (a1, a2, a3−a1, . . . , ak−ak−2, . . . an−an−2, −an−1, −an) (in which k is an integer indicating a bit-interval, and a1 . . . an are non-zero real numbers) at each bit-interval through said partial-response equalization circuit, and said reproduced signal waveforms are inputted into said maximum-likelihood decoder for data reproduction.

26. The signal processing apparatus according to claim 15, wherein said partial response equalization circuit has a DC-null frequency characteristic of not passing low-frequency signal components inclusive of DC components.

* * * * *